United States Patent Office 2,917,094
Patented Dec. 15, 1959

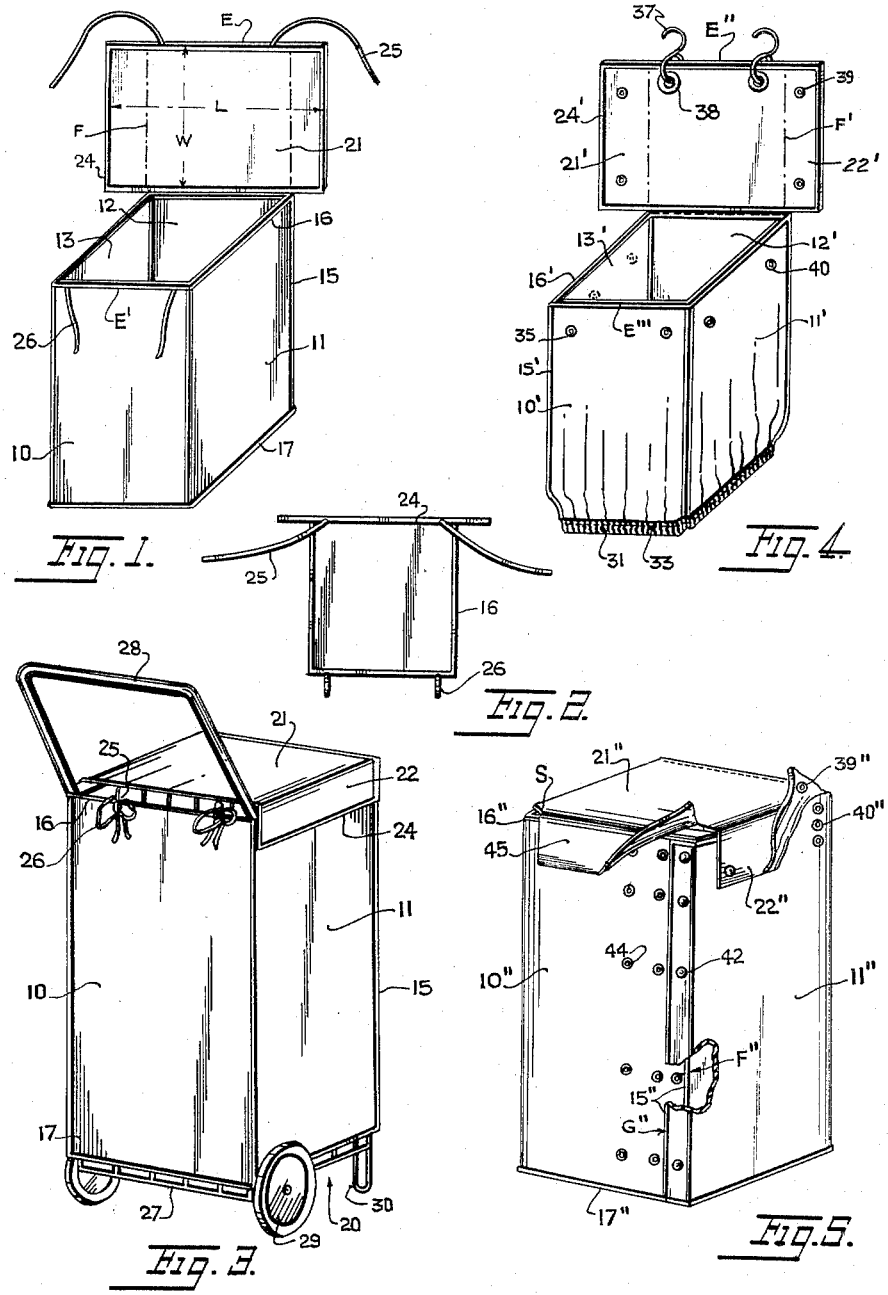

2,917,094

COVER FOR SHOPPING CARTS

Walter P. Sullivan, Brooklyn, N.Y.

Application November 25, 1957, Serial No. 698,815

3 Claims. (Cl. 150—52)

This invention concerns a cover for a shopping cart of the collapsible wire type.

The invention is directed at providing a removable cover made of plastic material which can be readily slipped over the cart to protect the contents thereof.

The cover is intended for use by a shopper to protect the contents of a shopping cart from the weather as well as to conceal the contents from the view of others.

Another object of the invention is to provide an economical, preformed, adjustable cover for a shopping cart.

According to the invention there is provided a cover in the form of a generally rectangular hollow box or sheath open at opposite ends so that the cover can be slipped over the sides of the cart. A flap is provided at one end of the sheath. This flap can be folded over the open top of the cart. Suitable fastening means are provided for securing the free edges of the flap to the body of the cover. Spaces are provided at the corners of the cover for an upwardly extending wire handle of the cart.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a cart cover embodying the invention, with the top flap disposed in a vertical position.

Fig. 2 is a top plan view of the cover of Fig. 1.

Fig. 3 is a perspective view of the cover mounted on a wire shopping cart.

Fig. 4 is a perspective view similar to Fig. 1 of another cover according to the invention.

Fig. 5 is a perspective view of still another cover.

In Figs. 1–3 there is shown a plurality of rectangular panels 10, 11, 12 and 13 formed of flexible plastic material such as polyethylene, vinyl copolymer, or the like. The material is preferably substantially non-porous and opaque so as to effectively resist wearing effects of wind, rain, dust and other adverse weather conditions. The panels may be secured together by binding tapes 15 along adjacent edges. The panels may be stitched at the edges to these tapes. If the panels are formed of thermoplastic material and the tapes are formed of similar material, then the panels can be joined by heat-sealing their adjacent edges to the tapes. Alternatively, the tapes 15 can be omitted and the adjacent edges of the panels can be electronically heat-sealed or welded together to form the rectangular box-like structure open at top and bottom ends, as shown in the drawing. In order to reinforce the free upper and lower edges, additional tapes 16 and 17 can be sewn or heat-sealed around the peripheral edges of the structure. The structure thus forms a sheath for the sides of a conventional wire shopping cart 20 as shown in Fig. 3. A rectangular flap 21 is secured to the top edge of the front panel 12. The length L of the flap is greater than the width of the sheath so that when the flap is folded down along doted lines F over the top of the sheath, two flap extensions 22 overhang the side panels 11 and 13.

A binding tape 24 is used to finish and reinforce the edges of the flap 21. A pair of cords or straps 25 are secured to the outer free edge E of flap 21. Corresponding cords or straps 26 are secured to the upper free edge E' of rear panel 10. The cords can be tied together as shown in Fig. 3 to hold the flap down over the open top of the cart.

The sheath is shaped to fit snugly on the cart and when slipped over the cart extends down almost to the bottom 27 thereof. The cart has the usual upwardly extending U-shaped wire handle 28. The width W of the flap is such that spaces are provided for extension of the sides of the handle out of the upper rear corners of the sheath adjacent the folded extensions 22 of the flap. Thus the sheath forms a substantially closed cover with open bottom which conceals and protects the contents of the cart, without interfering with the functioning of the wheels 29 or the legs 30 of the cart.

In the form of the invention shown in Fig. 4, an elastic tape or ribbon 31 is sewn by stitching 33 to the bottom edges of panels 10', 11', 12', 13'. This ribbon serves to constrict somewhat the lower end of the sheath so that when it is mounted on the cart a snug fit of the bottom of the sheath is obtained and the cover is held more securely in place. A pair of eyelets 35 are provided near the top of rear panel 10'. Hooks 37 secured in eyelets 38 near the free edge E'' of the flap 21' can be engaged in eyelets 35 to hold the free edge securely to adjacent edge E''' of panel 10'. On the flap extensions 22' are snap fastener elements 39 arranged to engage in mating snap fasteners 40 mounted on the outer sides of both side panels 11' and 13'.

In the form of the invention shown in Fig. 5, the body of the sheath may be farbicated from a single rectangular piece of heavy plastic material folded to form the panels 10'', 11'', 12'', 13''. Panels 10'' and 11'' are detachable from each other at their adjacent edges F and G, respectively. Snap fastener elements 42 are disposed in a spaced aligned array on panel 11'' near its free edge. A plurality of vertical rows of spaced fastener elements 44 are mounted on panel 10''. Elements 42 can be engaged in any one of the vertical rows to adjust the sheath to fit carts of different sizes. Edges F and G are finished with binding 15'' and the top and bottom edges are finished with bindings 16'' and 17'', respectively.

A pair of vertical rows of fastener elements 40'' are provided on each of panels 11'' and 13'' for adjustable engagement by fastener elements 39'' on flap extensions 22'''. A further free flap extension 45 can be provided for flap 21'' so that the extension overhangs the top of panel 10'' when the top of the cover is closed, as shown in Fig. 5. Corner cut-outs S are provided in the flap 21'' between extensions 22'' and 45 for projection of the sides of handle 28 of the cart therethrough. By means of the fasteners 42, 44 the sheath can be adjusted in circumferential length around the cart and by means of fasteners 39'', 40'' the cover can be adapted to carts of different lengths. If the cart is filled with packages which extend somewhat beyond the top of the cart, the adjustable fastening of the flap 21'' still permits the top of the cart to be effectively closed.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A protective cover for a shopping cart, comprising a plurality of rectangular panels of opaque, flexible plastic material, said panels joined together at side edges thereof to form a box-like sheath open at opposite ends, each free edge of the sheath at top and bottom thereof finished and reinforced with binding tape, the joined edges of the panels also reinforced with binding tape, a flap having one edge secured to one end of one of the panels, said flap being substantially rectangular and having a pair of lateral extensions unattached to said one panel, the perimeter of the flap reinforced with binding tape, said flap having a pair of cords secured at one end to another edge of the flap, the other ends of the cords being free, and another pair of cords secured at one end to the upper edge of another of said panels, the other ends of said latter cords being free, said free ends of the cords on the flap and panel engageable with each other so as to the tied together so that the flap covers the open top of the sheath with the lateral extensions hanging down the sides of oppositely disposed side panels of the sheath, said other edge of the flap positioned above and spaced from said other panel so that when the flap covers the open top of the sheath that spaces are provided for extension of sides of a handle of said cart upwardly therethrough.

2. A protective cover for a shopping cart, comprising a plurality of rectangular panels formed of opaque, flexible plastic material arranged to define a box-like sheath having flat sides, front and back walls and open bottom and top, a rectangular flap on the upper edge of the front panel, said flap having such dimensions that peripheral portions thereof overlap said flat sides and back wall, spaced cords disposed on the free long edge of the flap and spaced cords disposed on the sheath for selective tying engagement with said cords on the flap.

3. A protective cover for a shopping cart, comprising a plurality of rectangular panels of opaque, flexible plastic material, said panels joined together at side edges thereof to form a box-like sheath open at opposite ends, a flap having one edge secured to one end of one of the panels, said flap being substantially rectangular and having a pair of lateral extensions unattached to said one panel, said flap having a pair of cords secured at one end to another edge of the flap, the other ends of the cords being free, and another pair of cords secured at one end to the upper edge of another of said panels, the other ends of the latter cords being free, said free ends of the cords on the flap and panel engageable with each other so as to be tied together so that the flap covers the open top of the sheath with the lateral extensions hanging down the sides of oppositely disposed side panels of the sheath, said other edge of the flap above and spaced from said other panel so that positioned when the flap covers the open top of the sheath spaces are provided for extension of sides of a handle of said cart upwardly therethrough.

References Cited in the file of this patent

UNITED STATES PATENTS

| | | |
|---|---|---|
| 1,040,300 | Fitzgerald | Oct. 8, 1912 |
| 1,689,736 | Massopust | Oct. 30, 1928 |
| 2,490,250 | Boener | Dec. 6, 1949 |
| 2,498,113 | Milner | Feb. 21, 1950 |
| 2,741,287 | Michaud | Apr. 10, 1956 |